(12) United States Patent  
Fukuda et al.

(10) Patent No.: US 7,228,045 B2  
(45) Date of Patent: Jun. 5, 2007

(54) OPTICAL WAVEGUIDE DEVICE AND METHOD OF MANUFACTURING SAME

(75) Inventors: Chie Fukuda, Yokohama (JP); Tetsuya Hattori, Yokohama (JP); Morihiro Seki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/087,544

(22) Filed: Mar. 24, 2005

(65) Prior Publication Data

US 2005/0213917 A1    Sep. 29, 2005

(30) Foreign Application Priority Data

Mar. 26, 2004    (JP) .............................. 2004-092394

(51) Int. Cl.  
*G02B 6/10* (2006.01)  
*C03B 37/10* (2006.01)

(52) U.S. Cl. .................. 385/132; 385/129; 65/386

(58) Field of Classification Search ........ 385/129–132; 65/386  
See application file for complete search history.

(56) References Cited

U.S. PATENT DOCUMENTS 6,795,631 B2 *    9/2004    Noro et al. ................. 385/132

FOREIGN PATENT DOCUMENTS

| JP | 05-215929 | * | 3/1992 |
| JP | 2000-121859 A | | 4/2000 |
| JP | 2003-161852 A | | 6/2003 |

* cited by examiner

*Primary Examiner*—Ellen E. Kim  
(74) *Attorney, Agent, or Firm*—Global IP Counselors, LLP

(57) ABSTRACT

A method of manufacturing an optical waveguide device that is capable of reducing the imbalance in the refractive index profile of a core, and an optical waveguide device that has the reduced imbalance in the refractive index profile are provided. The method of manufacturing an optical waveguide device has the steps of forming a groove in a first cladding layer having a first dopant that lowers the refractive index of the first cladding layer below the refractive index of pure silica glass, forming a core in the groove, and forming a second cladding layer having a second dopant that lowers the refractive index of the second cladding layer below the refractive index of pure silica glass, over the first cladding layer and the core.

4 Claims, 3 Drawing Sheets

OPTICAL WAVEGUIDE DEVICE AND METHOD OF MANUFACTURING SAME

BACKGROUND OF THE INVENTION

1. Field of the Invention

The present invention relates to an optical waveguide device and to a method of manufacturing this device.

2. Description of the Background Art

Japanese Patent Application Publication No. 2000-121859 discloses a method of manufacturing an embedded type optical waveguide device. This method involves manufacturing an optical waveguide device by (1) depositing an undercladding layer over a silica glass substrate, (2) forming a mask over the undercladding layer, (3) using this mask to form a groove for accommodating a core, (4) depositing a core layer over the undercladding layer, (5) forming a core by leaving the core layer inside the groove and removing other portion of the core layer on the undercladding layer by chemical-mechanical polishing, and (6) forming an overcladding layer over the core and the undercladding layer.

Japanese Patent Application Publication No. 2003-161852 discloses a method of manufacturing a dielectric waveguide device. This method involves manufacturing an optical waveguide device by (1', 2') forming a mask over a glass substrate having a refractive index of 1.445, (3') forming a groove in the substrate by using RIE to etch the portion of the substrate exposed from the mask, (4') forming a glass film with a refractive index of 1.456 that will serve as a core, using an ICP-CVD apparatus, in the groove and over the mask, (5') removing the mask by wet etching, and (6') depositing a glass layer that will serve as overcladding.

With these methods, after a groove for accommodating a core has been formed on an undercladding layer, the core is formed in the groove. In order to make the refractive index of the core greater than the refractive index of the cladding, the core is doped with a dopant that increases the refractive index. More specifically, a gas for adding germanium is added to the raw material gas when the core film is formed. As a result, the core glass has a composition of $SiO_X$—$GeO_Y$. The core film is gradually deposited on the sides and bottom of the groove. Researches conducted by the inventors revealed that the germanium concentration in the two side walls of the core film inside the groove is higher than that in the middle part of the core, meaning that the germanium dopant is not evenly distributed. An inconsistent germanium concentration leads to an imbalance in the refractive index profile.

SUMMARY OF THE INVENTION

It is an object of the present invention to provide an optical waveguide device with reduced imbalance in the refractive index profile of the core, and a method of manufacturing such optical waveguide device.

One aspect of the present invention is a method of manufacturing an optical waveguide device, comprising the steps of forming a groove in a first cladding layer including a first dopant that lowers the refractive index of the first cladding layer below the refractive index of pure silica glass, forming a core in the groove, and forming a second cladding layer including a second dopant that lowers the refractive index of the second cladding layer below the refractive index of pure silica glass, over the first cladding layer and the core.

Another aspect of the present invention is an optical waveguide device, comprising a first cladding having a groove and including a first dopant that lowers the refractive index of the first cladding below the refractive index of pure silica glass, a core provided within the groove, and a second cladding provided over the first cladding and the core, and including a second dopant that lowers the refractive index of the second cladding below the refractive index of pure silica glass.

Advantages of the present invention will become apparent from the following detailed description, which illustrates the best mode contemplated to carry out the invention. The invention is capable of other and different embodiments, the details of which are capable of modifications in various obvious respects, all without departing from the invention. Accordingly, the accompanying drawings and description are illustrative, not restrictive, in nature.

BRIEF DESCRIPTION OF THE DRAWINGS

The present invention is illustrated by way of example, and not by way of limitation, in the figures of the accompanying drawings, in which reference numerals refer to similar elements.

FIG. 1A is a cross sectional view of a cladding member, FIG. 1B is a cross sectional view illustrating the groove being formed, FIG. 1C is a cross sectional view illustrating the core film being formed, FIG. 1D is a cross sectional view illustrating an etch-back resist being applied, FIG. 1E is a cross sectional view illustrating the etch-back being conducted, FIG. 1F is a cross sectional view illustrating the state after etch-back is concluded, and FIG. 1G is a cross sectional view illustrating the overcladding being formed.

FIG. 2A is an example in which the core includes a dopant, and FIG. 2B is an example in which the core does not include a dopant.

DETAILED DESCRIPTION OF THE INVENTION (Embodiment of a Method of Manufacturing an Optical Waveguide Device)

Figure 1A:
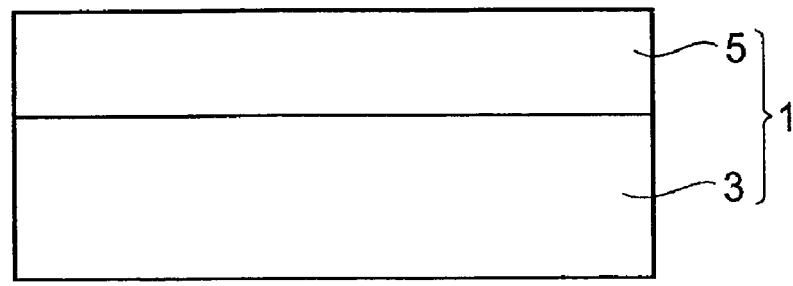
FIGS. 1A to 1G illustrate an embodiment of the method of manufacturing an optical waveguide device of the present invention.

FIG. 1A to 1G illustrate an embodiment of the method of manufacturing an optical waveguide device of the present invention, and FIG. 1A is a cross sectional view of a cladding member.

A cladding member 1 is provided as shown in FIG. 1A. At least part of the cladding member 1 includes a dopant. For example, when the surface layer of the cladding member 1 includes a dopant, the refractive index of the surface layer becomes lower than the refractive index of the base material. In an exemplifying example, the cladding member 1 comprises a substrate 3 and a first cladding layer 5 provided over the substrate 3. A silica glass substrate or silicon substrate can be used as the substrate 3, for example. The first cladding layer 5 has silicon oxide as its base material, includes a first dopant, and its refractive index is smaller than the refractive index of the base material. The first dopant is preferably at least either of fluorine and/or boron.

In a preferred example, the first cladding layer 5 that has been doped with fluorine is produced using the plasma CVD method prior to the step of forming the groove. The raw material gas is preferably one of a first combination including oxygen, an organosilicon compound, and a fluorocarbon, a second combination including oxygen, triethoxyfluorosilane (TEFS), and an organosilicon compound, and a third combination including oxygen and TEFS. An example of the first combination is a combination composed of oxygen, tetraethoxysilane (TEOS), and $CF_4$.

The thickness of the first cladding layer 5 is 28 micrometers, for example. The dopant concentration of fluorine may be 0.1 wt % or greater, for example, and with the concentration value, a relative refractive index difference of at least 0.1% with respect to the silica glass can be obtained. Alternately, the dopant concentration of fluorine can be 0.3 wt % or greater, for example, and with the concentration value, a relative refractive index difference of at least 0.3% can be attained, and a waveguide can be produced even when the core is pure silica glass. The dopant concentration of fluorine may be no more than 0.8 wt %, for example, and with the concentration value, the glass will not become cloudy even when annealing is performed under the same conditions as for a waveguide containing no fluorine. The relative refractive index difference $\Delta 1$ between the first cladding layer (refractive index n1) and the silica glass (refractive index n0) ($\Delta_1 = (n_1^2 - n_0^2)/2n_1^2$) is −0.45% in an exemplifying example.

In another preferred example, a first cladding layer 5 that has been doped with boron is produced by plasma CVD prior to the step of forming the groove. The raw material gas preferably contains oxygen, an organosilicon compound, and trimethylboron ($B(CH_3)_3$). Alternatively, flame hydrolysis deposition (FHD) can be used instead of CVD. With a FHD method, $SiCl_4$ and $BCl_3$ are subjected to flame hydrolysis, and glass microparticles are deposited on a substrate. After this deposition, the glass microparticles are consolidated at a temperature of 1000 degrees centigrade or higher. This consolidation process forms a cladding layer.

Figure 1B:
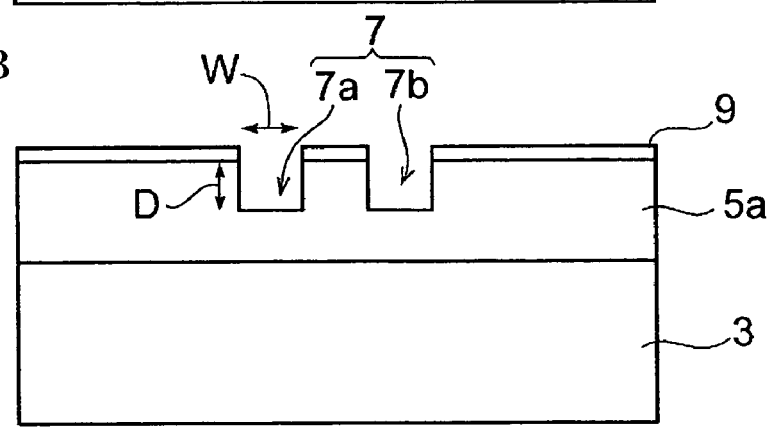

FIG. 1B is a cross sectional view illustrating the groove being formed. As shown in FIG. 1B, grooves 7a and 7b are formed in the first cladding layer 5. These grooves 7a and 7b are formed by etching. In an exemplifying example, after the cladding member 1 has been coated with an etching resist, the resist is patterned by photolithography to form a mask 9. This mask 9 is used to subject the cladding member 1 to reactive ion etching (RIE) with $C_2F_6$ gas. In a specific example, the width W of the grooves is 6 micrometers, and the depth D of the grooves is 6 micrometers. A metal etching mask can be used instead of the mask 9 made of a resist. Also, fluorocarbons such as $CF_4$, $CHF_3$, or $C_4F_8$ may be used instead of the above-mentioned gas. After etching, the mask 9 over the first cladding layer 5 is removed.

Figure 1C:
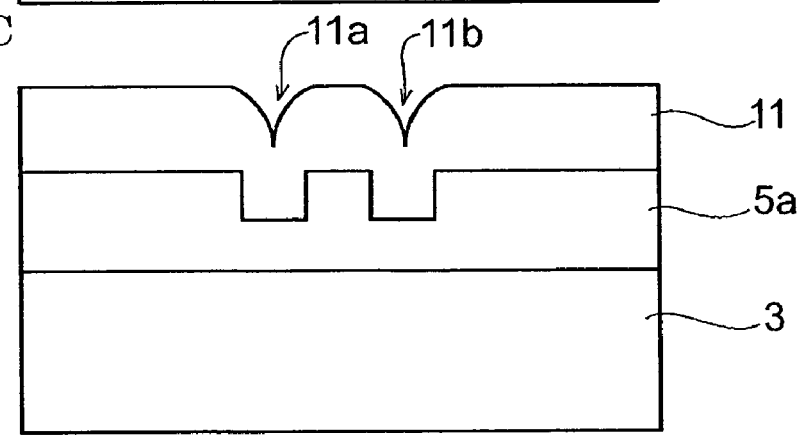

FIG. 1C is a cross sectional view illustrating the core film being formed. As shown in FIG. 1C, a core film 11 is formed over a first cladding layer 5a and within the grooves 7a and 7b. Channels 11a and 11b corresponding to the grooves 7a and 7b are remained in the core film 11. The bottom of the channels 11a and 11b does not reach inside the grooves 7a and 7b. The core film 11 can be formed by plasma CVD, for example. In an exemplifying example, a glass film of silicon oxide for the core of the optical waveguide is deposited by plasma CVD over the first cladding layer 5s and the grooves 7a and 7b. The raw material gas can be oxygen and tetramethoxysilane (TMOS). In order to fill the grooves 7a and 7b with the core film, the thickness of the core film 11 is preferably at least about 1.5 times the depth of the grooves 7, but this embodiment is not limited to this. In an exemplifying example, the film thickness on the top of the substrate is 9 micrometers such that the grooves 7, which have a depth of 6 micrometers, are filled with the core film.

It is preferable for the material of the core film 11 to contain substantially no dopant that could increase the refractive index of pure silica glass. In a preferred example, the core film 11 is made of pure silica glass. Since no dopant is added to the core in this case, the profile of the refractive index of the core does not vary as a result of dopant distribution.

Meanwhile, an optical waveguide device can also be produced using a core film including a dopant that increases the refractive index, and a cladding layer including a dopant that lowers the refractive index. Since the dopants in both the first and second cladding layers can be utilized to increase the relative refractive index difference required to realize the core-cladding structure, the dopant concentration in the core in this case is lower than the case where the cladding layer contains no dopant that lowers the refractive index. Consequently, there is little change in the dopant profile of the core in this case as well.

Figure 1D:
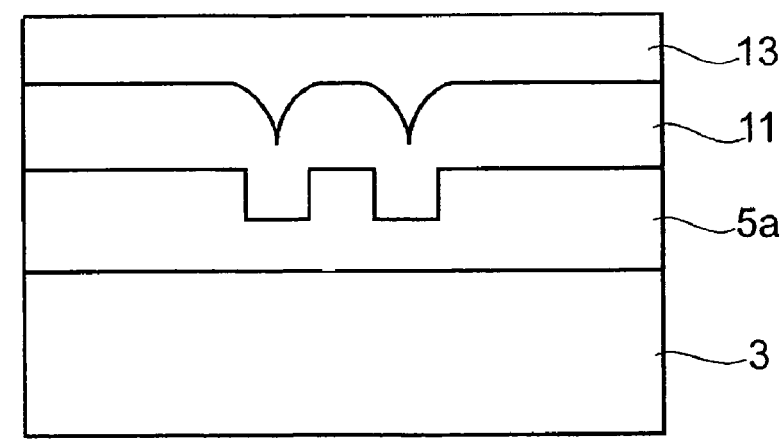

FIG. 1D is a cross sectional view illustrating the etch-back resist film being coated. As shown in FIG. 1D, the core film 11 is coated with a resist film 13. The resist film 13 is thick enough to embed the channels 11a and 11b. Only small bumps and pits remain on the surface of the resist film 13. In a specific example, the core film 11 is spin coated with the resist film 13 at a speed of 3000 rpm. This resist film is baked at 100 degrees centigrade. The thickness of the resist film is 6 micrometers, for example, and the bumps and pits in the surface of the resist film 13 are 0.2 micrometers.

Figure 1E:
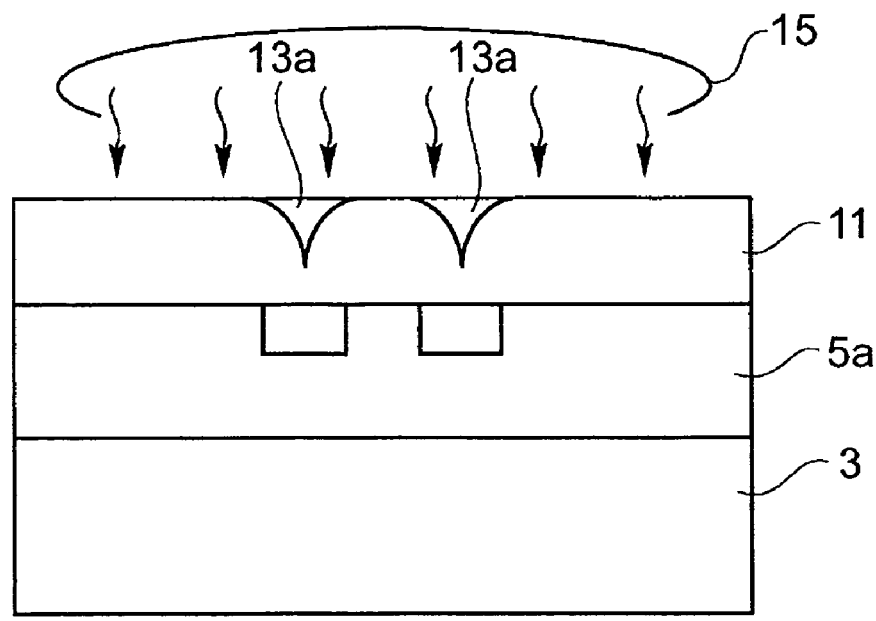
Figure 1F:
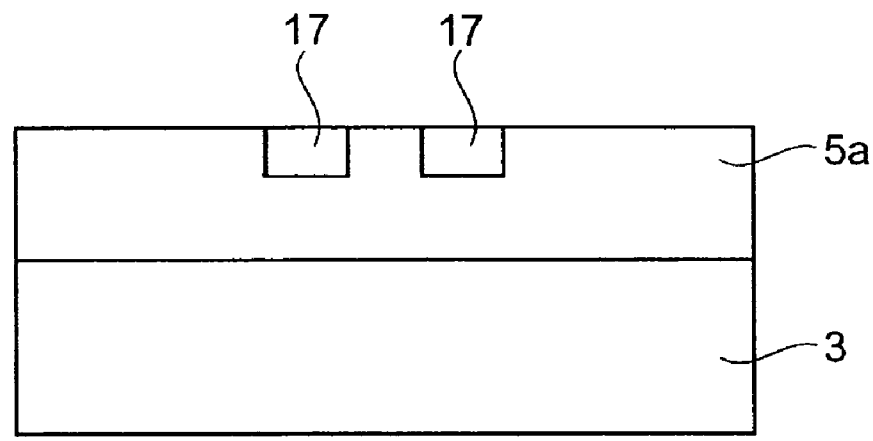

FIG. 1E is a cross sectional view illustrating the etch-back being conducted, and FIG. 1F is a cross sectional view illustrating the state after etch-back is concluded. As shown in FIG. 1E, the resist film 13 and the core film 11 are etched (15), leaving the core film in the grooves 7a and 7b. First, the surface layer of the resist film 13 is etched. Then, while the resist film 13 and the core film 11 etched simultaneously, the etching conditions are adjusted such that the etching rate will be substantially the same for both films. This etching 15 allows the core film to be left behind in just the grooves 7. In an exemplifying example, first, the resist film is dry etched with oxygen gas. Then, as shown in FIG. 1E, when the surface of the core film 11 is exposed, the etching gas is switched to a mixed gas of $C_2F_6$ and oxygen, and the resist film 13 and the core film 11 are etched. As shown in FIG. 1F, this etch-back yields the undercladding 5a and a core 17 for an optical waveguide. The etching rate of the resist film and the etching rate of the core film 11 can be kept the same by adjusting the mix ratio of the gases. For instance, the flux ratio of oxygen and $C_2F_6$ can be set at 14:100.

Figure 1G:
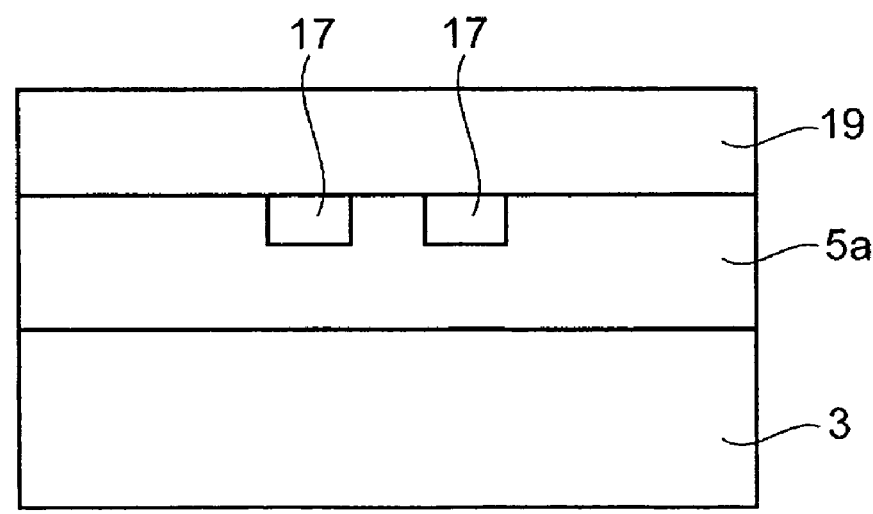

FIG. 1G is a cross sectional view illustrating the overcladding layer being formed. As shown in FIG. 1G, a second cladding layer 19 is formed over the first cladding layer 5a and the core 17. The second cladding layer 19 contains a second dopant. When this dopant is added to the base material, the refractive index of the second cladding layer 19 becomes smaller than the refractive index of the base material. The second dopant is preferably at least one of fluorine and boron.

In a preferred example, the second cladding layer 19 is produced by plasma CVD. A dopant is added to the second cladding layer 19. The addition of this dopant lowers the refractive index of the second cladding layer 19. In an exemplifying example, the second cladding layer 19 is composed of silicon oxide, and the dopant is at least one of fluorine and boron.

The raw material gas used for depositing a second cladding layer 19 including fluorine can be the same as the one used for the first cladding layer 5. The thickness of the second cladding layer 19 is 28 micrometers, for example. The concentration of the fluorine in the second cladding layer 19 is preferably the same as that in the first cladding layer.

In another exemplifying example, a cladding layer doped with boron is deposited. A glass film of silicon oxide doped with boron is deposited, for example, by the plasma CVD method, using $B(CH_3)_3$, TEOS, and oxygen. The weight percentage of boron oxide ($B_2O_3$) may be 4% or greater, for example, and with the concentration value a relative refractive index difference of at least 0.1% with respect to silica glass is obtained. Alternatively, the weight percentage of boron can be 12% or greater, for example, and with the concentration value, a waveguide can be produced even when the core is made of pure silica glass. Further, the weight percentage of boron may be 20% or smaller, for example, and with the concentration value, the glass will not become cloudy even when annealing is performed under the same conditions as in the case of a waveguide containing no boron.

With the optical waveguide of a directional coupler manufactured by the above method, the overcladding surface is flat. Also, even when two waveguides with a core height of 6 µm and a width of 6 µm are formed with the distance being as small as 1.5 µm (aspect ratio of 4) therebetween and thereby an optical coupling region is formed, there is no distortion of the cross sectional shape of the core or any deviation of the core spacing from the designed value, nor is there any unevenness of the refractive index within the core. Also, the designed branching ratio of the directional coupler matches with test results. Therefore, an optical waveguide device that exhibits good characteristics can be produced.

The first dopant added to the first cladding layer 5 lowers the refractive index of the first cladding below the refractive index of pure silica glass, and the second dopant used for the second cladding layer 19 lowers the refractive index of the second cladding below the refractive index of pure silica glass. Since dopants that lower the refractive index of the base material are added to the first and second cladding layers, the dopants in the first and second cladding layers can be utilized to obtain the relative refractive index difference required between the core and the cladding.

As described above, this embodiment provides a method of manufacturing an optical waveguide device that is capable of reducing the imbalance in the refractive index profile of a core.

(Embodiment of an Optical Waveguide Device)

Figure 2A:
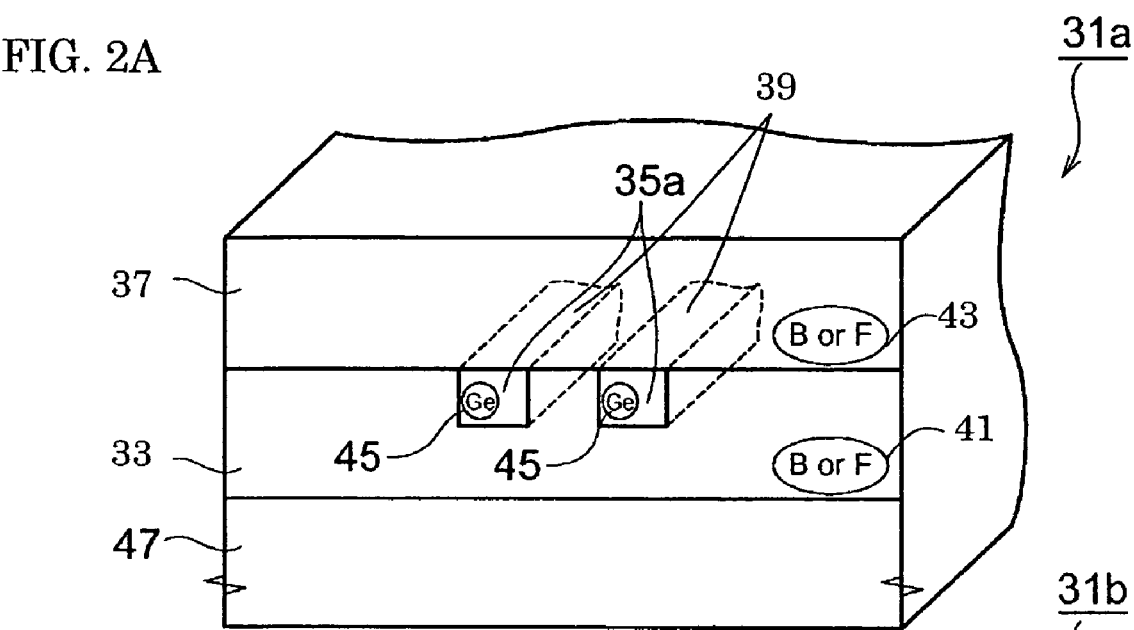
FIGS. 2A and 2B are cross sectional views illustrating an embodiment of the optical wave guide device of the present invention.
Figure 2B:
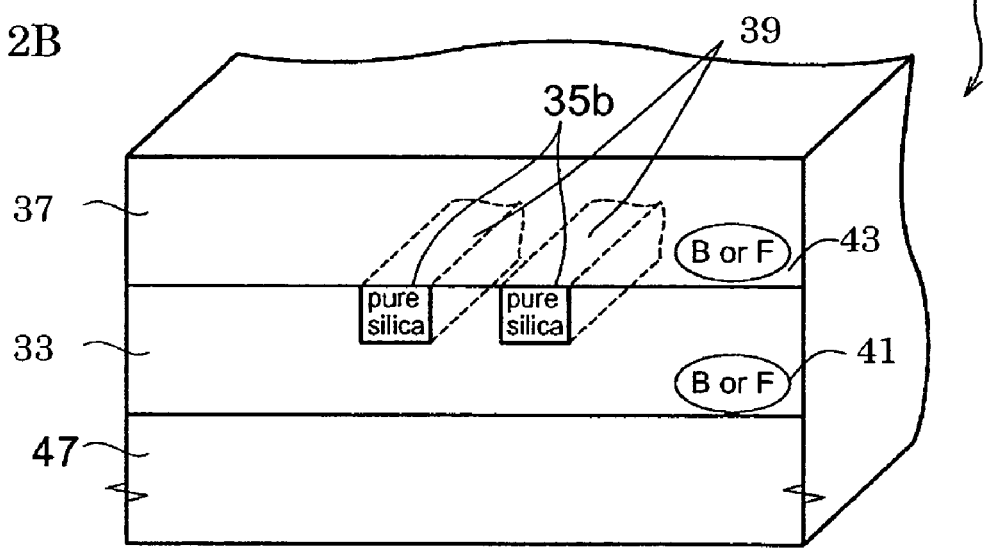

FIGS. 2A and 2B are cross sectional views illustrating an embodiment of the optical waveguide device of the present invention. FIG. 2A is an example in which the core includes a dopant, and FIG. 2B is an example in which the core does not include a dopant.

An optical waveguide device 31a in which the core includes a dopant comprises a first cladding 33, a core 35a, and a second cladding 37. The first cladding 33 is provided over a substrate 47, has a thickness of at least 10 micrometers, and has grooves 39 on the surface on the opposite side from the substrate 47. The first cladding 33 includes a first dopant 41, for instance at least one of fluorine and boron. The second cladding 37 has a thickness of at least 10 micrometers and no more than 30 micrometers, and includes a second dopant 43, such as at least one of fluorine and boron. The first dopant 41 lowers the refractive index of the first cladding 33 to below the refractive index of pure silica glass, and the second dopant 43 lowers the refractive index of the second cladding 37 below the refractive index of pure silica glass.

The core 35a is provided in the grooves 39 between the first cladding 33 and the second cladding 37. The core 35a includes a dopant 45 such as germanium that increases the refractive index with respect to pure silica glass.

With the optical waveguide device 31a, since the first and second claddings 33 and 37 contain dopants 41 and 43 that lower the refractive index of each, the dopants 41 and 43 can be utilized to obtain the necessary relative refractive index difference between the core 35a and the claddings 33, 37, and the amount of the dopant 45 can be reduced. Accordingly, the mode shape of the waveguide is less likely to be affected by the distribution of the dopant 45.

With an optical waveguide device 31b in which the core includes no dopant, the core 35b is composed of pure silica glass. The core 35b is surrounded by the first cladding 33 and the second cladding 37. Since the core includes no dopant, the mode shape of the waveguide is not affected by the distribution of the dopant in the core 35b.

As described above, this embodiment provides an optical waveguide device with reduced imbalance in the refractive index profile of the core.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2004-092394 filed on Mar. 26, 2004 including specification, claims, drawings, and summary is incorporated herein by reference in its entirety.

What is claimed is:

1. A method of manufacturing an optical waveguide device comprising the steps of:

forming a groove in a first cladding layer having a first dopant that lowers the refractive index of the first cladding layer below the refractive index of pure silica glass;

forming a core in the groove, the core being composed of pure silica glass; and forming a second cladding layer including a second dopant that lowers the refractive index of the second cladding layer below the refractive index of pure silica glass, over the first cladding layer and the core.

2. A method of manufacturing an optical waveguide device according to claim 1, wherein the first dopant comprises at least one of fluorine and boron; and the second dopant comprises at least one of fluorine and boron.

3. A method of manufacturing an optical waveguide device according to claim 1, further comprising the step of producing the first cladding layer by plasma CVD prior to the step of forming a groove, wherein the raw material gas is one of a first combination including oxygen, an organosilicon compound, and a fluorocarbon, a second combination including oxygen, triethoxyfluorosilane, and an organosilicon compound, and a third combination including oxygen and triethoxyfluorosilane.

4. A method of manufacturing an optical waveguide device according to claim 1, further comprising the step of producing the first cladding layer by plasma CVD prior to the step of forming a groove, wherein the raw material gas includes oxygen, an organosilicon compound, and trimethylboron.

* * * * *